United States Patent [19]

Bennett

[11] 4,250,349

[45] Feb. 10, 1981

[54] DRAFT/FREE SAFETY ENCLOSURE

[76] Inventor: Robert A. Bennett, 170 Sturbridge Rd., Easton, Conn. 06425

[21] Appl. No.: 120,639

[22] Filed: Feb. 11, 1980

[51] Int. Cl.³ .............................................. H02G 3/14
[52] U.S. Cl. ..................................... 174/67; 220/242; 220/375; 339/44 R
[58] Field of Search ................... 174/67; 220/242, 375; 339/36, 37, 38, 44 R, 44 M

[56] References Cited

U.S. PATENT DOCUMENTS

| 1,399,899 | 12/1921 | Sontgerathe et al. | 339/44 R |
| 2,878,456 | 3/1959 | Cormier | 339/44 R |

Primary Examiner—B. A. Reynolds
Assistant Examiner—D. A. Tone

[57] ABSTRACT

A device adapted for use with an electrical outlet mounted in a suitable support and having the dual function when the outlet is not in use of preventing drafts of air from flowing through the outlet and blocking accidental access to the outlet. The device uses a relatively flat member having a rear surface adapted to be secured to said support and an exposed front surface. The member has an aperture adapted to overlie and expose the outlet, said aperture having a peripheral wall extending between said rear and front surfaces. The wall has an opening which extends in depth from the rear surface to a position intermediate the front and rear surfaces and which has a uniform width. The member has an outer periphery, a portion of said periphery being disposed adjacent said opening. A cover adapted for removable sealing engagement with said aperture is disposed adjacent said front surface, said cover engaging said peripheral wall when sealing said aperture. A thin flexible ribbon of uniform width, the opening being wider than said ribbon, passes through said opening between said peripheral portion of the outer periphery and said cover. One end of said ribbon is secured to said peripheral portion, the other end of the ribbon being secured to the outer periphery of said cover.

5 Claims, 8 Drawing Figures

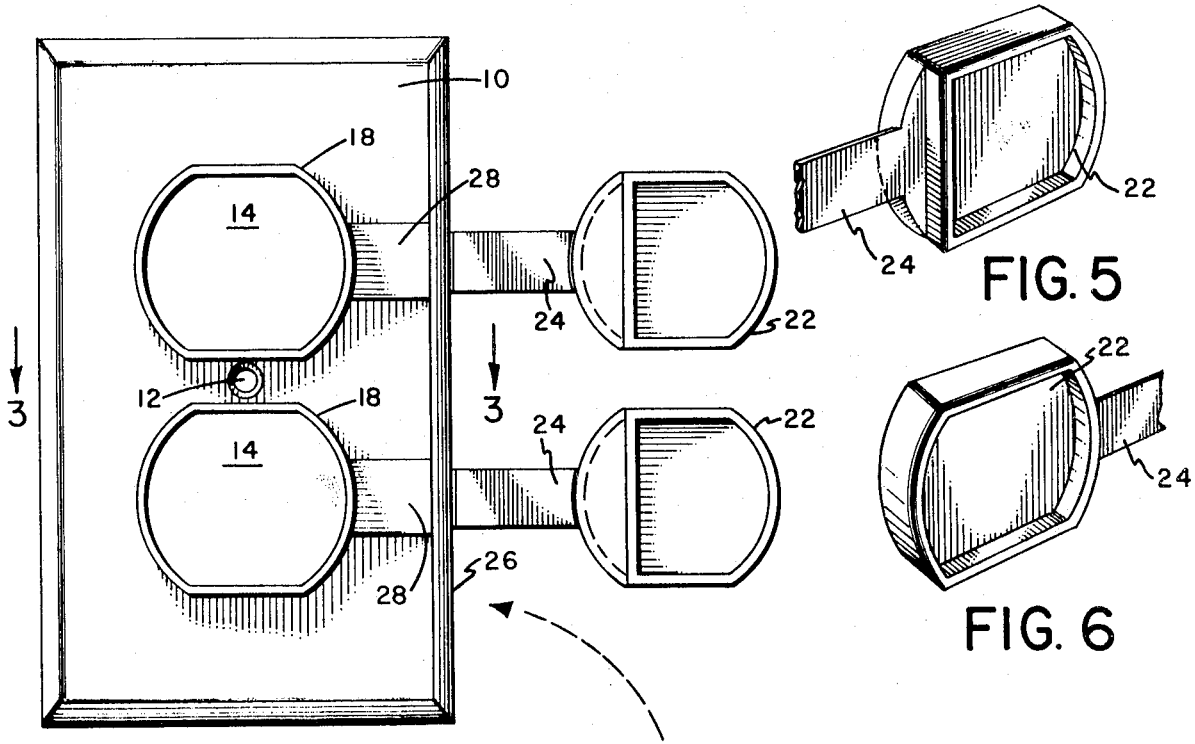
FIG. 1
FIG. 5
FIG. 6
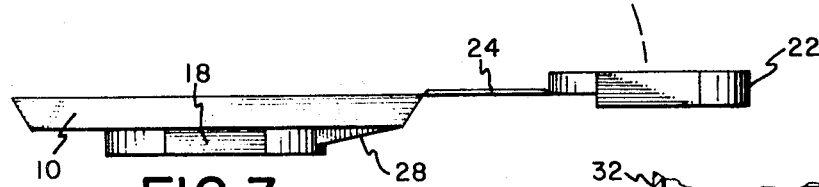
FIG. 3
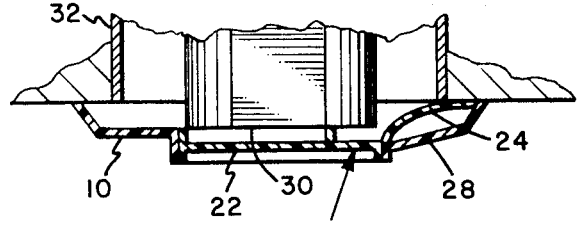
FIG. 4A
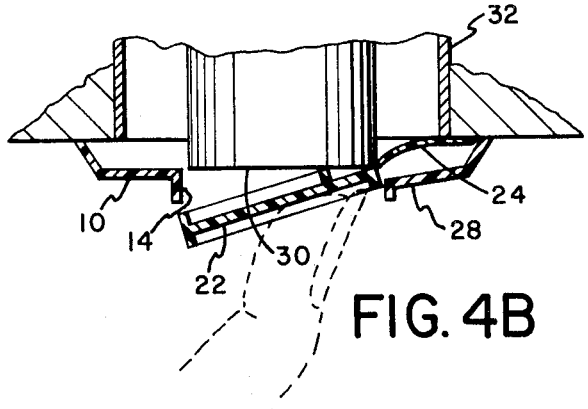
FIG. 4B
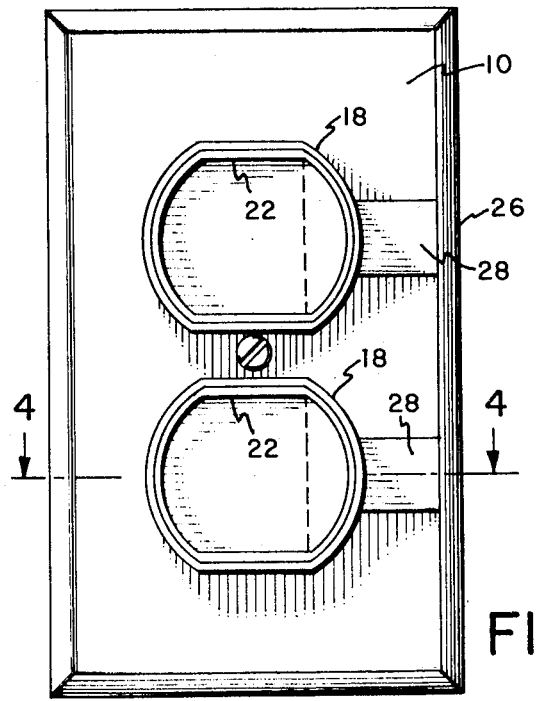
FIG. 2

DRAFT/FREE SAFETY ENCLOSURE

BACKGROUND OF THE INVENTION

Wall or floor mounted electrical outlets, as is well known, can represent electrical hazards to young children and various devices known as safety enclosures have been developed to eliminate such hazards. Such outlets, as is less well known, often allow cold air to flow through the openings in the outlets from within the walls or floors to flow into rooms containing such outlets, thereby creating drafts.

This invention is directed toward a new type of device which, when the outlet is not in use, blocks accidental access to the outlet and at the same time eliminates drafts. The device can be constructed easily and inexpensively out of a single piece of material such as plastic, is extremely durable and can be easily installed or removed by any adult using only a screwdriver.

SUMMARY OF THE INVENTION

This invention, as indicated above, is a device adapted for use with an electrical outlet mounted in a suitable support and having the dual function when the outlet is not in use of preventing drafts of air from flowing through the outlet and blocking accidental access to the outlet.

In accordance with the principles of the invention, a relatively flat member having a rear surface adapted to be secured to said support and an exposed front surface has an aperture adapted to overlie and expose the outlet. The aperture has a peripheral wall which extends between the rear and front surfaces. The wall has an opening which extends in depth from the rear surface to a position intermediate the front and rear surfaces and which has a uniform width. The member has an outer periphery, a portion of said periphery being disposed adjacent said opening.

A cover adapted for removable sealing engagement with said aperture is disposed adjacent said front surface, said cover engaging said peripheral wall when sealing said aperture.

A thin flexible ribbon of uniform width is secured at one end to the peripheral portion of the member and is secured at the other end to the outer periphery of the cover. The opening has a width which is greater than that of the ribbon. The ribbon intermediate its ends passes through the opening in the peripheral wall.

In use, when the cover is disposed in the aperture in sealing engagement with the peripheral wall, the outlet is inaccessible whereby accidental access cannot occur and there are no drafts. The cover can be released from the engagement only when manual pressure is applied to the cover at the point at which the cover and ribbon are joined whereby this point is pushed inward and the opposite point on the cover pivots outwardly. The cover can then be swung out of the way to allow the outlet to be used.

Pressure at any other point on the cover will not release the cover. Consequently accidental release is most unlikely to occur.

As will be explained in more detail below, the entire device, member, cover and ribbon can be formed from one integral piece of plastic and the member, cover and ribbon can be installed and used without being separated from each other. The plastic piece retains its integral nature throughout its useful life.

BRIEF DESCRIPTION OF THE DRAWINGS

FIG. 1 is a front plan view of the invention with covers open.

FIG. 2 is a view similar to FIG. 1 but with covers closed.

FIG. 3 is a view taken along line 3—3 in FIG. 1.

FIG. 4A is a view taken along line 4—4 in FIG. 2.

FIG. 4B is a view similar to FIG. 4A but illustrating the pivotal action.

FIG. 5 is a detail rear view of a cover used in the invention.

FIG. 6 is a detail front view of a cover used in the invention.

DETAILED DESCRIPTION OF PREFERRED EMBODIMENT

Figure 7:
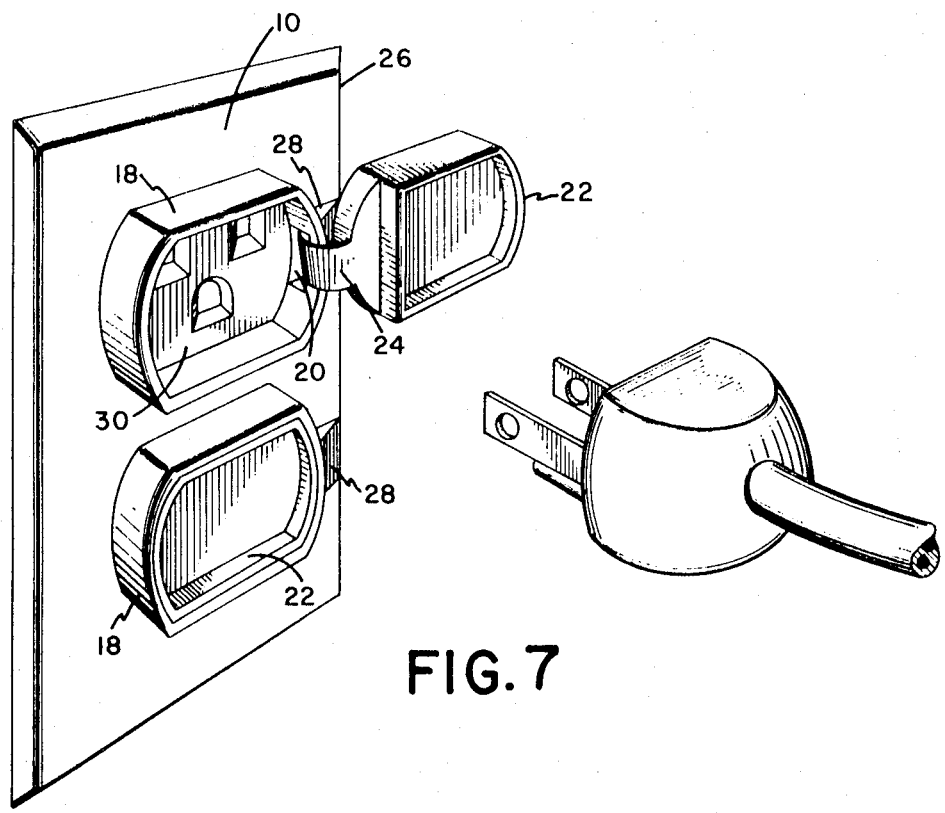
FIG. 7 is a perspective view of the invention in use.

Referring now to FIGS. 1-7, the entire device can be molded out of a single piece of plastic such as polypropalene.

A flat rectangular sheet or member 10 has the shape of a conventional outlet cover plate with a central small hole 12 for receiving a retaining screw. The member has two spaced apertures 14 each adapted to overlie and expose an electrical outlet 16 when the member is in place.

Each aperture has a peripheral wall 18 which extends outward from the rear surface of the member toward and outwardly past the exposed front surface of the member. Each wall has adjacent the right hand longitudinal edge 26 of the member periphery an opening 20 which extends in depth from the rear surface to a position midway between the rear and front surfaces. The opening 20 has uniform width.

Each aperture has associated therewith a corresponding cover 22 which can be moved into and out of sealing engagement with the corresponding wall of the corresponding aperture.

When the device is originally formed each cover is connected by a flat flexible horizontal ribbon 24 to the edge 26. The ribbon is secured to a portion of the outer periphery of the cover. Each cover is then swung forward through the rear of the corresponding aperture and out the front as suggested by the dotted line in FIG. 3.

At this point each ribbon extends through the opening 20 of the corresponding wall. The width of the ribbon is less than that of the opening so that each ribbon is freely movable therein.

Then the cover can be used to seal the aperture as shown in FIG. 4A or can be released by the pivot action as shown in FIG. 4B.

The member has two raised sections 28 each of which extends between a corresponding peripheral wall of an aperture and edge 16 to conceal the ribbon from view.

In use the outlet or outlets 30 are held in position in conventional manner in outlet box 32 with the member replacing the conventional cover as shown in FIG. 7.

The connection between edge 26 and each ribbon 24 is sometimes called a "living hinge."

What is claimed is:

1. A device adapted for use with an electrical outlet mounted in a suitable support and having the dual function when the outlet is not in use of preventing drafts of air from flowing through the outlet and blocking accidental access to the outlet, said device comprising:

a relatively flat member having a rear surface adapted to be secured to said support and an exposed front surface, said member having an aperture adapted to overlie and expose the outlet, said aperture having a peripheral wall extending between said rear and front surfaces, the wall having an opening which extends in depth from the rear surface to a position intermediate the front and rear surfaces and which has a uniform width, the member having an outer periphery, a portion of said periphery being disposed adjacent said opening;

a cover adapted for removable sealing engagement with said aperture and disposed adjacent said front surface, said cover engaging said peripheral wall when sealing said aperture; and a thin flexible ribbon of uniform width, the opening being wider than said ribbon, said ribbon passing through said opening between said peripheral portion of the outer periphery and said cover, one end of said ribbon being secured to said peripheral portion, the other end of the ribbon being secured to the outer periphery of said cover.

2. The device of claim 1 wherein said member, cover and ribbon are an integral unit.

3. The device of claim 2 wherein said member has a rectangular shape.

4. The device of claim 3 further including a second like aperture in the member spaced from the first aperture and having a like opening and like wall, a second like cover adapted for removable sealing engagement with the second aperture and a second like ribbon connected between the second cover and the member in the same manner as the original ribbon is connected between the original cover and the member.

5. The device of claim 3 wherein said ribbon is concealed when the cover engages the aperture.

* * * * *